United States Patent
Quan

(10) Patent No.: US 11,550,816 B1
(45) Date of Patent: Jan. 10, 2023

(54) VARIABLE REPLICATION LEVELS FOR AN OBJECT OF A SNAPSHOT OF A BLOCK STORAGE VOLUME

(71) Applicant: Amazon Technologies, Inc., Seattle, WA (US)

(72) Inventor: Shengjie Quan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/806,914

(22) Filed: Mar. 2, 2020

(51) Int. Cl.
 *G06F 16/00* (2019.01)
 *G06F 16/27* (2019.01)

(52) U.S. Cl.
 CPC .................................. *G06F 16/27* (2019.01)

(58) Field of Classification Search
 CPC ...................................................... G06F 16/27
 See application file for complete search history.

(56) References Cited

U.S. PATENT DOCUMENTS

| | | |
|---|---|---|
| 8,131,924 B1 | 3/2012 | Frandzel et al. |
| 8,789,208 B1 | 7/2014 | Sundaram et al. |
| 9,235,588 B1 * | 1/2016 | Vaikar .................. G06F 3/0685 |
| 9,417,815 B1 | 8/2016 | Elisha |
| 9,547,560 B1 * | 1/2017 | Lee ....................... G06F 3/065 |
| 9,569,123 B2 | 2/2017 | Desantis et al. |
| 9,697,061 B1 | 7/2017 | Lazier |
| 10,223,365 B2 | 3/2019 | Kottomtharayil et al. |
| 10,324,803 B1 | 6/2019 | Agarwal |
| 10,437,787 B2 | 10/2019 | Plisko et al. |
| 10,545,776 B1 | 1/2020 | Kowalski et al. |
| 10,592,351 B1 | 3/2020 | Desai |
| 10,824,513 B1 | 11/2020 | Chandrashekhara et al. |
| 11,016,671 B2 | 5/2021 | Kumar et al. |
| 11,029,851 B2 | 6/2021 | Kumar et al. |
| 11,086,542 B1 | 8/2021 | Kumar et al. |
| 2003/0182313 A1 | 9/2003 | Federwisch et al. |
| 2006/0230076 A1 * | 10/2006 | Gounares ............ G06F 11/2094 |
| 2010/0223495 A1 * | 9/2010 | Leppard ................ G06F 11/004 |
| | | 711/E12.001 |

(Continued)

FOREIGN PATENT DOCUMENTS

WO    WO 2021/062248 A1    4/2021

OTHER PUBLICATIONS

International Search Report and Written Opinion in PCT/US2020/052853 dated Jan. 21, 2021.

*Primary Examiner* — Khanh B Pham
(74) *Attorney, Agent, or Firm* — Knobbe, Martens, Olson & Bear, LLP

(57) ABSTRACT

Systems and methods are provided to manage a replication service of a block storage volume to increase dependability and/or decrease data loss. Each snapshot of a block storage volume can include a point-in-time representation of the volume. Each snapshot may include multiple objects that correspond to one or more blocks of the volume. One or more objects of a snapshot may reference a parent snapshot instead of a block of the volume. Each object of a snapshot may be replicated a number of times based on the number of references by other snapshots. The number of replicas may be based on the number of snapshots referencing the object or the number of unique clients referencing the object. The replication service can manage the replicas of the object and increase or decrease the number of replicas as needed.

20 Claims, 6 Drawing Sheets

(56) References Cited

U.S. PATENT DOCUMENTS

| | | |
|---|---|---|
| 2013/0007389 A1 | 1/2013 | Patterson et al. |
| 2013/0132346 A1 | 5/2013 | Varadarajan |
| 2014/0181021 A1 | 6/2014 | Montulli et al. |
| 2014/0195754 A1 | 7/2014 | Colgrove et al. |
| 2014/0330784 A1 | 11/2014 | Sundaram et al. |
| 2015/0127608 A1 | 5/2015 | Hsieh et al. |
| 2015/0212893 A1 | 7/2015 | Pawar et al. |
| 2015/0212897 A1 | 7/2015 | Kottomtharayil et al. |
| 2015/0254020 A1 | 9/2015 | Taylor et al. |
| 2016/0048430 A1 | 2/2016 | Bolik et al. |
| 2016/0314046 A1 | 10/2016 | Kumarasamy |
| 2017/0004048 A1 | 1/2017 | Adkins |
| 2017/0031616 A1 | 2/2017 | Vijayan et al. |
| 2017/0123931 A1 | 5/2017 | Aizman et al. |
| 2017/0286234 A1 | 10/2017 | Shulga et al. |
| 2019/0012357 A1 | 1/2019 | Schreter |
| 2019/0220198 A1 | 7/2019 | Kashi Visvanathan et al. |
| 2019/0332269 A1* | 10/2019 | Greenwood ............ G06F 3/061 |
| 2019/0332593 A1 | 10/2019 | Graham et al. |
| 2020/0241756 A1* | 7/2020 | Lee ........................ G06F 3/065 |
| 2020/0348876 A1 | 11/2020 | Sergeev et al. |
| 2021/0096958 A1 | 4/2021 | Kumar et al. |
| 2021/0096961 A1 | 4/2021 | Kumar et al. |
| 2021/0191634 A1* | 6/2021 | Zafman ................ G06F 3/0659 |

\* cited by examiner

VARIABLE REPLICATION LEVELS FOR AN OBJECT OF A SNAPSHOT OF A BLOCK STORAGE VOLUME

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by a network service provider to adapt to changing requirements of users. For example, the elasticity of these resources can be in terms of processing power, storage, bandwidth, and so forth. Elastic computing resources may be delivered automatically and on-demand, dynamically adapting to the changes in resource requirements on or within a given user's system. For example, a client can use a network service to host a large online streaming service, set up with elastic resources so that the number of web servers streaming content to users may scale up to meet bandwidth requirements during peak viewing hours, and then scale back down when system usage is lighter.

A client typically will rent, lease, or otherwise pay for access to the elastic resources accessed through network service, and thus does not have to purchase and maintain the hardware and/or software that provides access to these resources. This provides a number of benefits, including allowing users to quickly reconfigure their available computing resources in response to changing demands of their enterprise and enabling the network service provider to automatically scale provided computing service resources based on usage, traffic, or other operational requirements. This dynamic nature of network service computing services, in contrast to a relatively static infrastructure of on-premises computing environments, requires a system architecture that can reliably re-allocate its hardware according to the changing needs of its client base and demands on the network-based computing services.

Cloud computing environments may provide a number of functionalities similar to on-premises environments. For example, cloud computing environments may enable a client to create a volume representing a block storage device, which can be used in a manner similar or identical to a physical hard disk. A cloud computing environment may also provide functionality to save a state of such a volume, such as by taking a "snapshot" of the volume. Each snapshot may correspond to a data set that reflects a point-in-time representation of blocks of the block storage volume. Snapshots may beneficially be used to backup data of the volume. To protect against data loss, snapshots themselves may be replicated, such that loss of a single replica does not result in loss of the snapshot. However, storage of snapshots may require significant storage resources, which resource use is compounded when snapshots are replicated.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
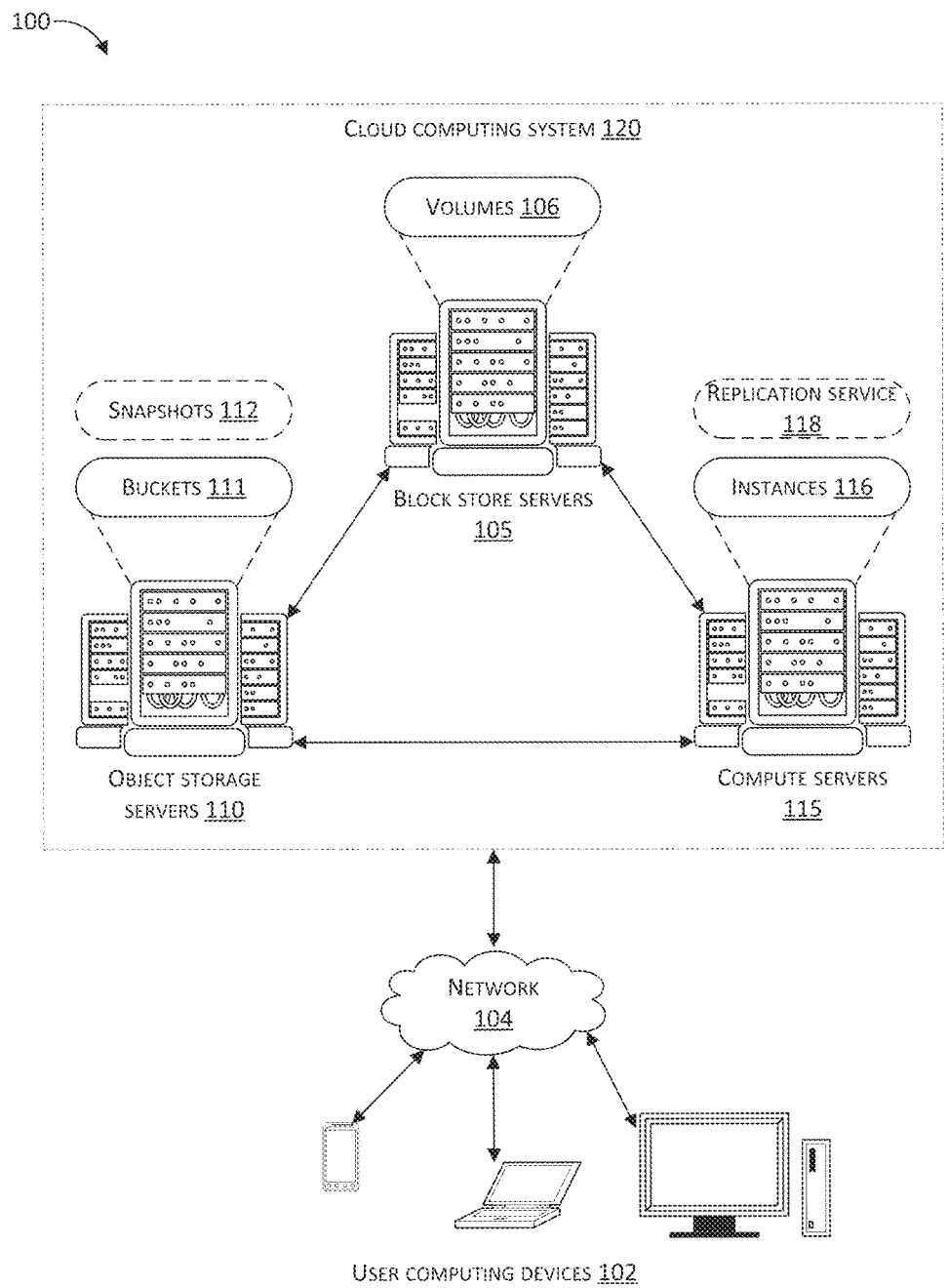
FIG. 1 depicts a schematic diagram of a cloud computing system in which various embodiments according to the present disclosure can be implemented.

Generally described, aspects of the present disclosure relate to the managing replication of snapshot data in a networked computing environment. Replication beneficially increases resiliency of the snapshot data to errors, such as hardware failures, software failures, or natural disasters that may render all or a portion of the snapshot data unreadable. However, replication also increases the storage resources need to store snapshot data. Embodiments of the present disclosure enable a balancing of these requirements, by replicating snapshot data based at least partly on the "blast radius" of that snapshot data, as reflected by the number of snapshots that rely on that snapshot data. More specifically, embodiments of the present disclosure can provide a relatively high level of replication when a portion of snapshot data is relied on by a large number of snapshots, and a relatively low level of replication when a portion of snapshot data is relied on by a smaller number of snapshots. These embodiments can therefore incur the storage costs associated with replication of snapshot data only in cases where such replication is justified, while reducing storage costs by electing to replicate less relied-on snapshot data at a lower level.

As noted above, a snapshot can correspond to a data set that reflects a point-in-time representation of blocks of a block storage volume. In some instances, the data set may be stored as a set of objects (e.g., files) on an object storage service. Illustratively, each object may correspond to a point-in-time representation of one or more blocks of a virtualized block storage device. Further, such snapshots may correspond to a manifest, which identifies the objects making up the snapshot, and records a correspondence between each object and corresponding blocks of the block storage device. Multiple snapshots may exist for a given block storage device, reflecting states of the device at different times. For example, a snapshot for a device may be created periodically, such as each day. In that instance, a given block within a device may be represented within multiple snapshots. For example, a first snapshot may record a first point-in-time representation of the block and a second snapshot may record a second point-in-time representation of the block. However, in instances where the state of the block does not change over time, storing the same point-in-time representation of a block within two snapshots can be inefficient and use excess storage resources.

One option to address the aforementioned problems is to utilize incremental snapshots, that can "inherit" data from an ancestor snapshot. For example, a system may create a first snapshot with an object that corresponds to the point-in-time representation of the block. Subsequent snapshots that should reflect the same point-in-time representation of the block may then include a reference to the corresponding data of the first snapshot, without needing to include a duplicate copy of that data. This solution can reduce storage requirements for subsequent snapshots of the same volume. However, use of incremental snapshots can also undesirably increase risk of data loss, because a loss of the data of the first snapshot can impact a multitude of snapshots that reference the data of the first snapshot. This can lead to a loss in durability and availability.

Thus, in some cases, an adverse event for data of one snapshot, such as an object on an object storage service, may have a cascading affect across multiple snapshots and lead to potential data loss. On the other hand, storing only non-incremental snapshots, where each snapshot represents a full state of a block storage device, can be inefficient and expensive in terms of computational resource costs.

The presently disclosed technology addresses these problems by providing replicas of snapshot data based on the scope of an adverse impact in the event of loss of that snapshot data, which scope is illustratively measured based on a number of snapshots that rely on that snapshot data. For example, where loss of snapshot data will affect a high number of snapshots (e.g., because each of those snapshots references the snapshot data), the data may be replicated numerous times. Where loss of snapshot data will affect a lower number of snapshots (e.g., because one or few snapshots reference that data), the data may not be replicated or may be replicated a low number of times (e.g., once). Additionally, embodiments of the disclosed technologies can provide systems and methods to modify the number of replicas of data based off the severity of an impact (e.g., data with a high impact may have three replicas and data with a higher impact may have five replicas). While some embodiments are discussed herein with reference to objects on an object storage service, each of which contains a set of snapshot data that may be referenced by one or more snapshots, other embodiments may utilize other groups of snapshot data.

In accordance with embodiments of the present disclosure, a replication service can be implemented for determining the number of replicas for each object referenced by a set of snapshots. The replication service may illustratively operate with respect to all snapshots stored by a cloud computing system, which may be maintained on behalf of multiple clients. The replication service may be configured to run automatically and periodically manage the number of replicas for each object, or may run in response to a request or call by a client. When run, the replication service may parse the data associated with each snapshot to determine replication levels for the objects referenced by those snapshots. In order to determine the correct replication levels for each object, the replication service may access the manifests of each of the snapshots. The replication service may be configured to parse the manifests of each of the snapshots for pertinent data for the replication service. For example, the replication service may determine, for each object referenced by a snapshot, the number of snapshots that reference that object or the number of distinct clients that have stored a snapshot referencing that object.

The replication service may then determine a replication level for each object based on the number of snapshots that reference the object, a number of clients with snapshots that reference the object, a combination thereof, or other pertinent data obtained from the manifests of the snapshots. For example, an object more highly referenced may be replicated more times than an object less highly referenced. In some instances, the replication service may be preconfigured (e.g., by an administrator) with data indicating a desired replication level for an object based a given number of references to that object. In another embodiment, desired replication levels may be provided by a user. For example, desired replication levels may indicate that objects should not be replicated (e.g., should be stored once) when referenced by fifteen snapshots or less, should be replicated n times when referenced by between fifteen and fifty snapshots, should be replicated m times when referenced by more than fifty snapshots, etc. (which the particular "bands" of references may be suited to a particular system or user). In another embodiment, the replication service may be configured to base the replication levels on relative reference levels for a given set of objects. For example, the replication service may analyze the manifests and determine that 90% of objects are referenced by five or fewer snapshots, 95% of objects are referenced by ten or fewer snapshots, and 98% of objects are referenced by twenty-five or fewer snapshots. The replication service may then determine that the objects ranked in the bottom 90% should not be replicated, the objects ranked between 90% and 95% should be replicated n times, the objects ranked between 95% and 98% should be replicated m times, and the objects ranked 98% and above should be replicated j times.

The replication service may be further configured to determine the current number of replicas of each object. The replication service may then determine that a number of replicas need to be generated or removed for a given object based on the desired replication level. For example, for an object with five replicas and a desired replication level of ten replicas, the replication service may determine that five replicas of the object need to be generated. The replication service may be configured to then modify the number of replicas of an object in the object storage service in accordance with that determination. In one embodiment, the object storage service may be configured to store each of the replicas on different servers, to increase resiliency in case of hardware failure. In some instances, the object storage service may be configured to store each of the replicas on servers of different geographic locations, to increase resiliency in case of geographic incidents, such as natural disasters. Further, the object storage service may be configured to store each of the replicas on an isolated server. Each of the replicas may be stored on a server that is isolated from the servers storing the object.

The replication service may similarly be configured to remove replicas from the object storage service when the desired replication level of an object falls below a current replication level. In some instances, removal of replicas may occur similarly to creation of replicas. For example, the replication service may determine a desired replication level for data of a snapshot, and delete replicas of that data that exceed the desired replication level. In other instances, removal of replicas may occur via associated replicas with time-to-live values or similar expiration periods. For example, each replica may, when created, be associated with a given time-to-live, such as n days. On each instance that a replication level for a desired set of data is determined (such as each day), the time-to-live for any replicas up to the desired replication level may be reset. The replication service or other process may then delete any replicas with an expired time-to-live value. Thus, should a replica exceed a desired replication level for data, the replica can be deleted subsequent to that expiration. This "garbage collection" of unnecessary replicas can reduce excessive use of storage resources.

The replicas of each object created by the replication service can illustratively be used in case of data corruption for an instance of an object. For example, when attempting to restore state to a block storage device using a snapshot, a block storage service implementing the device may attempt to read data from each object of a snapshot. In the instance that the read object has become corrupted, the block storage service may read data from a replica of the object created by the replication service. In one instance, identifying information for each replica may be maintained at the replication service, and as such, the block storage service may query the replication service to identify the replica. In another instance, replicas may be stored on the object storage service at a pre-defined location (e.g., a "replica" bucket corresponding to an "original" snapshot bucket), and the block storage service may identify the replica based on that pre-defined location. In some instances, a block storage service or the replication service may periodically inspect objects of snapshots to detect potential corruption, and may restore the object using a created replica if such corruption is detected. For example, the block storage service may detect such corruption of the object and may cause a snapshot to be associated with a created replica.

In the following description, various examples will be described. For purposes of explanation, specific configurations and details are set forth in order to provide a thorough understanding of the examples. However, it will also be apparent to one skilled in the art that the embodiments may be practiced without the specific details. Furthermore, well-known features may be omitted or simplified in order not to obscure the embodiments being described.

FIG. 1 depicts an example computing environment 100 including a cloud computing system 120 in which the disclosed replication service can be implemented. The cloud computing system 120 may be a cloud provider network (sometimes referred to simply as a "cloud"). The cloud refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud computing system 120. It will be appreciated that the disclosed replication and management techniques may be implemented in non-elastic computing environments as well.

The cloud computing system 120 can be accessed by user computing devices 102 over a network 104. The cloud computing system 120 includes one or more block store servers 105, one or more object storage servers 110, and one or more compute servers 115 that are in networked communication with one another and with the network 104 to provide users with on-demand access to computing resources including volumes 106, buckets 111, and instances 116, among others. These particular resources are described in further detail below. Some implementations of cloud computing system 120 can additionally include domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The cloud computing system 120 can provide on-demand, scalable computing platforms to users through the network 104, for example allowing users to have at their disposal scalable "virtual computing devices" via their use of the block store servers 105, object storage servers 110, and compute servers 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud computing system 120 can be provided across a number of geographically separate regions, for example to provide users with lower latencies by having their virtual computing devices in or near their geographic location. Each region is physically isolated from and independent of every other region in terms of location and power supply, and may communicate data with the other regions through the network 104. Each region can include two or more availability zones each backed by one or more physical data centers provided with redundant and separate power, networking and connectivity to reduce the likelihood of two zones failing simultaneously. While a single availability zone can span multiple data centers, no two availability zones share a data center. This can protect users from data-center level failures. A data center refers to a physical building or enclosure that houses and provides power and cooling to one or more of the block store servers 105, object storage servers 110, and compute servers 115. The data centers within an availability zone and the availability zones within a region are connected to one another through private, low-latency links, for example fiber optic network cables. This compartmentalization and geographic distribution of computing hardware enables the cloud computing system 120 to provide fast service to users on a global scale with a high degree of fault tolerance and stability. To distribute resources evenly across the zones in a given region, the provider of the cloud computing system 120 may independently map availability zones to identifiers for each user account.

Turning specifically to the roles of the different servers within the cloud computing system 120, the compute servers 115 include one or more servers on which provide resizable computing capacity to users for building and hosting their software systems, for example through an elastic compute cloud service (referred to in various implementations as an elastic compute service, a virtual machines service, a computing cloud service, a compute engine, or a cloud compute service). Users can use the compute servers 115 to launch as many virtual computing environments, referred to as "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data is lost.

Instances 116 (also referred to as virtual machines) may additionally be utilized to implement various functionalities on behalf of the cloud computing system 120. For example, instances 116 may be utilized to implement "control plane" functions of the system 120, enabling users to configure elements of the system 120. In some examples, instances implementing control plane functions may run on hosts that are shared with customers of the cloud computing system 120. In some examples, instances implementing control plane functions may run on fixed hosts that are not shared with customers. In accordance with embodiments of the present disclosure, the compute servers 115 may implement a replication service 118 as one or more instances 116, which service 118 may operate to determine a replication level for snapshot data stored at the system 120 and to replicate that snapshot data in accordance with the determined replication level. While shown in FIG. 1 as implemented by the compute servers 115, the replication service 118 may additionally or alternatively be implemented by one or more distinct servers 115 (e.g., isolated from instances 116 implemented on behalf of users).

The block store servers 105 provide persistent data storage for the compute servers 115 in the form of volumes 106, for example through an elastic block store service (referred to in various implementations as cloud disks service, a managed disk service, a storage area network service, a persistent disk service, or a block volumes service). The block store servers 105 include one or more servers on which data is stored as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "block") can be, for example, 512 bytes, 1 kilobyte ("kB"), 4 kB, 8 kB, 16 kB, 32 kB, 64 kB, 128 kB, 256 kB, 512 kB, or larger, depending upon the implementation. The snapshots described herein may include any number of such blocks. The size of a snapshot may vary, depending for example upon the size of the user volume for which the snapshot is created.

User volumes 106, which can be treated as an individual hard drive ranging for example from 1 GB to 1 terabyte TB (or more) in size, are made of one or more blocks stored on the block store servers 105. Although treated as an individual hard drive, it will be appreciated that a volume may be stored as one or more virtualized devices implemented on one or more underlying physical host devices. Volumes 106 may be partitioned a small number of times (e.g., up to 16) with each partition hosted by a device of the cloud computing system 120 that has the ability to transfer data at around 1 GB per second ("Gbps") in some implementations. These volumes provided persistent, dedicated storage that can be attached to particular instances of the compute servers 115. Each volume may be attached to a single instance running on a compute server 115, and can be detached from that instance and re-attached to another. The block store servers 105 may have built-in redundancy for volumes by replicating the volume across multiple servers within an availability zone, which means that volumes will not fail if an individual drive fails or some other single failure occurs.

The object storage servers 110 represent another type of storage within the cloud computing system 120. The object storage servers 110 include one or more servers on which data is stored as objects within resources referred to as buckets 111, for example through a simple storage service (referred to in various embodiments as an object storage service, blob storage service, cloud object storage service, or cloud storage service). Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, such that authorized access to them can be obtained through requests from networked computing devices in any location. Each bucket 111 is associated with a given user account. Users can store as many objects as desired within their buckets, can write, read, and delete objects in their buckets, and can control access to their buckets and the objects contained therein. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of the vast scalability and metadata characteristics of the object storage servers 110. The object storage servers 110 can support highly parallel data accesses and transfers.

The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data.

While the object storage servers 110 can be used independently from the instances 116 and volumes 106 described above, they can also be used to provide data backup with respect to snapshots 112, representing object-stored backups of volume data. More specifically, when a user desires to backup the data of a volume 106, that data (represented as state information for a set of blocks of the volume 106) can be transferred to the buckets 111 as a snapshot 112. Each snapshot 112 is illustratively represented within one or more buckets 111 as a set of objects, where each object represents the state of one or more blocks of the volume 106. Users may interact with the system 120 to manage snapshots 112, such as to create a snapshot 112 from a volume 106 or to restore a snapshot 112 to the volume 106, thus reverting blocks of the volume 106 to the state reflected in the snapshot.

In addition to a set of objects reflecting states of blocks of a volume 106, each snapshot 112 further includes or corresponds to a manifest. When the cloud computing system 120 creates the snapshot 112, the cloud computing system 120 may store the manifest of the snapshot 112 in object storage 110 to provide metadata corresponding to the objects of the snapshot 112. The manifest may include a designation of the objects making up the snapshot 112, and the blocks of the volume 106 represented by that snapshot 112. For example, a manifest may reflect that object A on the servers 110 represents blocks 1-5 of a given volume 106, that object B represents blocks 6-10 of that volume, etc. In one embodiment, snapshots are "sparsely" populated, such that only blocks of a volume 106 that have been written to are stored as an object.

As discussed above, snapshots 112 may be incremental, such that a later snapshot 112 of a volume 106 reflects only changes to the blocks of the volume 106 made since a prior snapshot 112. Incrementality of snapshots may be illustratively represented as a tree data structure, with a root snapshot 112 representing a complete record of a state of a volume 106, and with each "child" node representing a modification to one or more blocks of the root snapshot 112. In accordance with that structure, relationships between snapshots 112 can be denoted as familial, with the root snapshot 112 being a "parent" to any snapshots 112 directly referencing the parent, a "grandparent" to snapshots 112 created from child snapshots 112 of the root, etc. Because snapshots 112 can be restored and modified multiple times, a single snapshot 112 may serve as parent to multiple other snapshots 112, each representing a different modification to the blocks of the parent. Relationships between snapshots are illustratively reflected in the manifest data. For example, a child snapshot 112 may indicate, within its manifest data, its parent snapshot 112. When reading a snapshot 112, the system 120 may assume that block data not reflected in a manifest of a child snapshot 112 can instead be identified in the manifest of the parent snapshot 112. Thus, for example, a parent snapshot's 112 manifest may reflect that object A stores blocks 1-5 and that object B stores blocks 6-10. A child snapshot's 112 manifest may reflect that object C stores blocks 6-10. Thus, to recreate a state of a volume 106 reflected in the child snapshot 112, the system 120 can combine the information of block C, as indicated in the manifest of the child snapshot 112, and of block A, as indicated in the parent snapshot 112. The system 120 may ignore object B, as blocks 6-10 are already represented in the child snapshot's 112 manifest. Thus, the object storage server 110 can be used to store a variety of state information regarding volumes 106 in an efficient manner.

As illustrated in FIG. 1, the cloud computing system 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example desktop computers, laptops, smartphones, tablets, e-readers, gaming consoles, and the like. Users can access the cloud computing system 120 via the network 104 to view or manage their data and computing resources, as well as to use websites and/or applications hosted by the cloud computing system 120.

Figure 2:
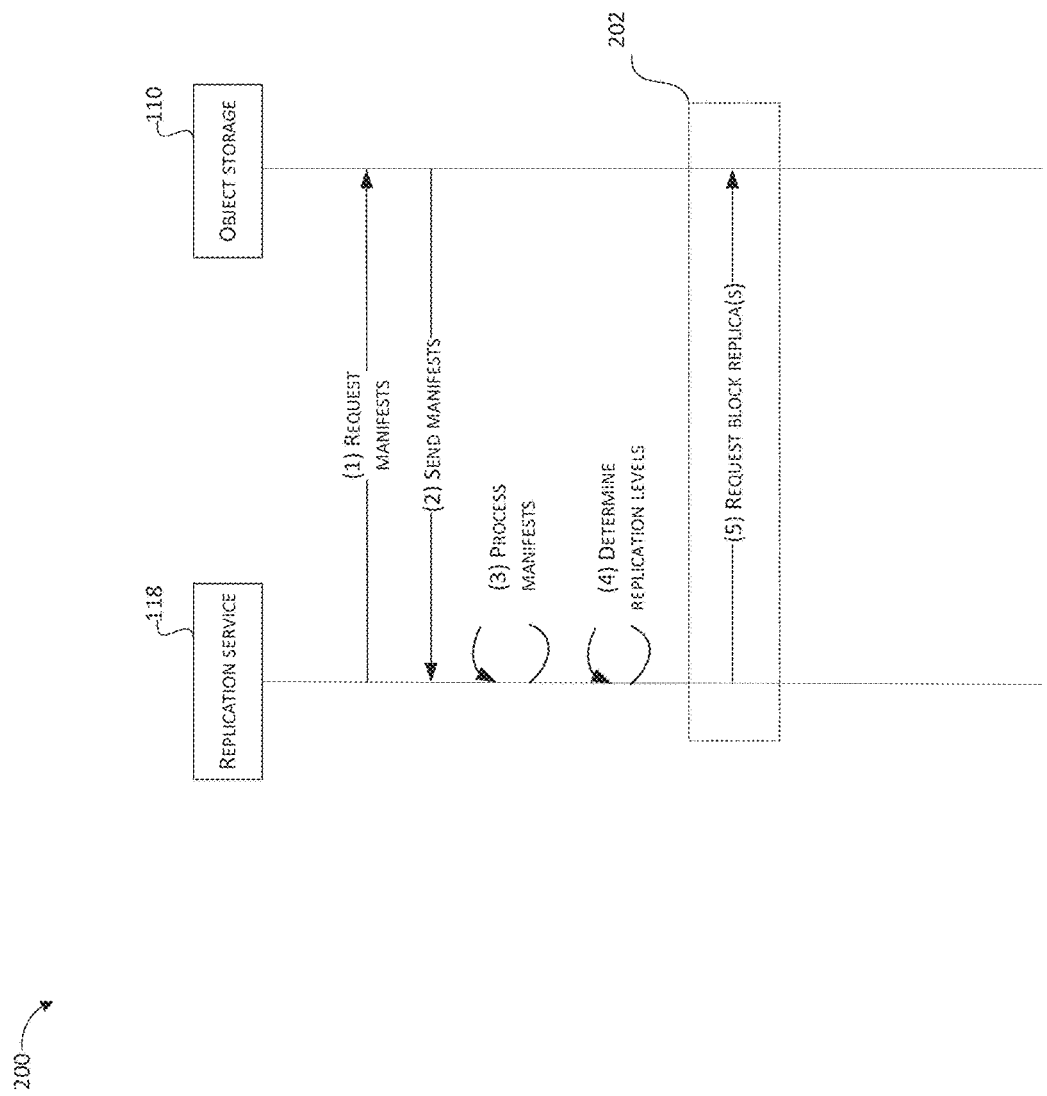
FIG. 2 depicts an example workflow for managing a replication service within the network environment of FIG. 1 in accordance with aspects of the present disclosure.

FIG. 2 depicts interactions among the various components shown in FIG. 1 in managing a replication service in accordance with aspects of the present disclosure. The replication service may run automatically or the replication service maybe initiated be a user. In one embodiment, a user may specify the parameters to be used for operating the replication service, such as, for example, (i) thresholds associated with various replication levels, (ii) location of replica objects, (iii) authorized groupings of snapshots corresponding to one object, etc.

As shown in FIG. 2 at (1), the replication service 118 requests snapshot manifests associated with snapshots from the object storage 110. When a snapshot is created, a manifest of the snapshot may be stored in object storage 110 to provide metadata corresponding to the snapshot data or objects of the snapshot. The object storage 110 may store manifests corresponding to a plurality of snapshots. The replication service 118 may be configured to request a number of the manifests stored in the object storage 110. For example, the replication service 118 may be configured to request all manifests associated with one client or with one group of clients. Further, the replication service 118 may be configured to request all manifests referencing the same block store volume. Further, the replication service 118 may be configured to request all manifests associated with clients with other shared characteristics, clients with a higher level of replication protection, etc. At (2), the object storage 110 provides the requested manifests to the replication service 118.

At (3), the replication service 118 processes the manifests provided by the object storage 110. The replication service 118 may process the manifests and store the relevant information as an object record for each object, the object record containing a parsed version of the manifest. The replication service 118 may be configured to update a previously generated objects record based on a provided manifest. The object records may include information pertaining to a plurality of objects from a plurality of snapshots. The object records may include information concerning multiple objects, each of which records a different a point-in-time representation of the same block. For example, a first object might represent a first version of a block and a second object might represent an updated version of the same block. The object records may collect information such as the name and location of the snapshot, the name of the client, the name or location of the objects referenced by the snapshot, and the name or location of the objects of the snapshot. In one embodiment, the object records may exclude information pertaining to objects only referenced by a certain number of snapshots. For example, if an object is referenced by less than a certain number of snapshots, the object may not be included in the object records. Further, the replication service 118 may collect the parsed data of the object records and provide further statistical analysis of the relationships between the snapshots and/or the objects. For example, the number of snapshots referencing the object and/or the number of unique clients referencing the object.

At (4), the replication service 118 may determine a replication level for each object. The replication service 118 may determine replication levels corresponding to the risk to overall snapshot durability posed by each snapshot. The replication service 118 may use the data provided by the object records to determine a corresponding replication level for each object. The replication service 118 may perform further statistical analysis on the object records to illustrate statistical comparisons between one or more objects as it pertains to one or more common data points. For example, the replication service 118 may be configured to establish a hierarchical ranking of the objects according to the data in the object records which may include unique customers referencing the object, unique snapshots referencing the object, etc. For example, the replication service 118 may rank objects according to the number of unique clients referencing the object or the number of snapshots referencing the object.

The replication service 118 may use the comparison between the objects and a corresponding object threshold to determine the replication level for each object. For example, the replication service 118 may determine replication levels of each object based on an application of an object threshold corresponding to the determined object records. The object thresholds may be predetermined by the system or they may be provided by a user. In another embodiment, the object threshold may be provided according to the statistical analysis of the object records. For example, the object thresholds may be based on the results of the statistical analysis of the replication service 118. Each object threshold may correspond to a particular statistical analysis of the object records and multiple object thresholds may correspond to the same statistical analysis of the object records and the same object. For example, if an object threshold corresponds to 10 unique clients per object, the replication service 118 may determine that objects 1, 2, and 3 of Snapshot 1 and object 4 of Snapshot 2 correspond to 10, 25, 11, and 50 unique clients respectively, based on the object records, and therefore, objects 1, 2, and 3 of Snapshot 1 and object 4 of Snapshot 2 may be replicated. The replication service 118 may be configured to determine replication levels for each object for multiple object thresholds and corresponding object records. For example, the replication service 118 may determine a first replication level for an object based on the number of unique clients associated with the object and a second replication level for the object based on the number of snapshots associated with the object. The replication service 118 may be configured to select one object threshold for each object. In one embodiment, the replication service 118 may provide multiple replication levels for an object and the replication service 118 may be configured to select the higher/highest replication level for the object. In another embodiment, the replication service 118 may be configured to combine the multiple replication levels or otherwise adjust the replication levels.

The replication service 118 may further be configured to designate higher replication levels for objects where the corresponding object record surpasses a plurality of object thresholds. Further, the replication service 118 may be configured to designate higher replication levels for objects based on the amount that the corresponding object record surpasses the object threshold. For example, if a first object threshold corresponds to 5 unique clients referencing the object and a second object threshold corresponds to 10 snapshots referencing the object, a first object having a first object record of 7 unique clients and a second object record of 15 snapshots may have a higher replication levels than a second object having a first object record of 8 unique clients and a second object record of 9 snapshots based on the first object surpassing two object thresholds and the second object surpassing only object threshold. Therefore, the replication service 118 may request more replicas for the first object and less replicas for the second object. In another implementation, the number of object replicas may be uniform. For example, each object meeting or surpassing any object thresholds may be replicated twice. The replication service 118 may generate the object thresholds based off of the object records. For example, the replication service 118 may determine that 90% of objects are referenced by three or less clients and may generate a threshold level of four unique clients referencing an object for replication of the object. Further, the replication service 118 may determine that 50% of objects are referenced by one client, 60% of objects are referenced by two or less clients, and 90% of objects are referend by three or less clients. The replication service 118 may be configured to generate replication levels for each of two, three, or more clients referencing the object.

At (5), the replication service 118 may request the object replicas to be generated by the object storage 110 based on the replication levels for each object. In one embodiment, requests are sent iteratively or in parallel for each object, as shown by loop 202. The object storage 110 may take as input an object index indicating the location of the object being replicated, the length of the object, and checksum information. The object storage 110 may further take as input the replication levels determined by the replication service 118. The object storage 110 may be configured to generate and store the object replicas on a server of the object storage 160 separate from the server storing the corresponding object. In one implementation, each object replica may be placed on a separate server of the object storage 110. In one implementation, the replication service 118 may request the number of block replicas to be reduced.

Figure 3A:
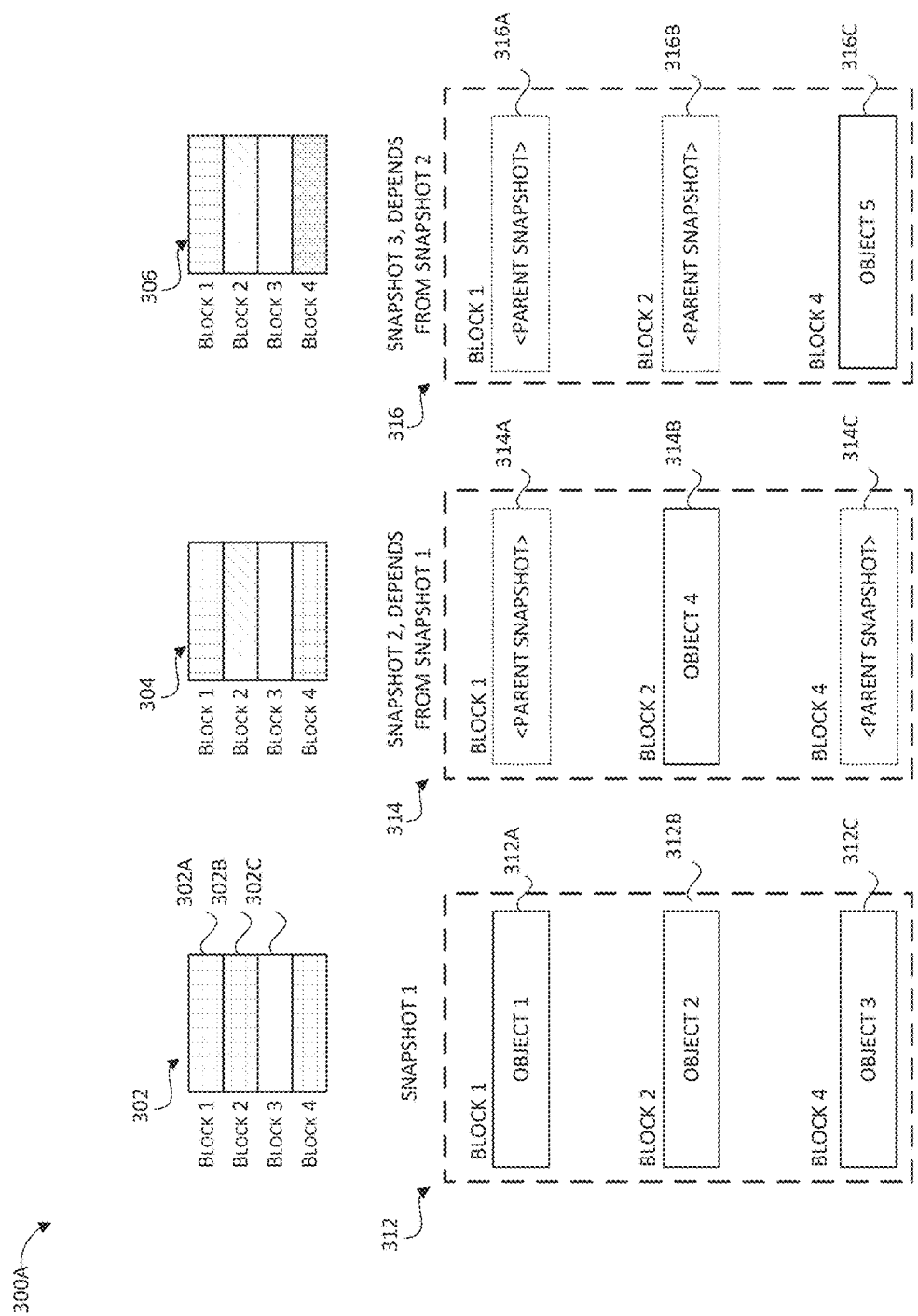
FIG. 3A depicts an example volume and three example snapshots of the volume in accordance with aspects of the present disclosure.

FIG. 3A depicts an example system 300A including an example volume at three different time periods (a first volume 302, a second volume 304, and a third volume 306) and snapshots of the volume 312, 314, and 316. The first volume 302, the second volume 304, and the third volume 306 each represent a different point-in-time representation of the same logical volume. Further, the first volume 302 corresponds to the first snapshot 312, the second volume 304 corresponds to the second snapshot 314, and the third volume 306 corresponds to the third snapshot 316. It should be understood that these depictions of the volume and the snapshots are only one example implementing one or more aspects of the present disclosure. While the first volume 302, the second volume 304, and the third volume 306 are depicted to be comprised of four operating-system level blocks, a person skilled in the art would understand that the volumes can have more or less than four blocks (and, in practice, would generally contain hundreds, thousands, tens of thousands, or more blocks). Furthermore, while each of the first snapshot 312, the second snapshot 314, and third snapshot 316 are depicted to be comprised of three objects (e.g., because one block of the volume is unwritten), a person skilled in the art would understand that each of the snapshot can have more or less than three objects. Each block of the first volume 302, the second volume 304, and the third volume 306 may further be logically partitioned into partitions or sub-blocks.

Figure 3B:
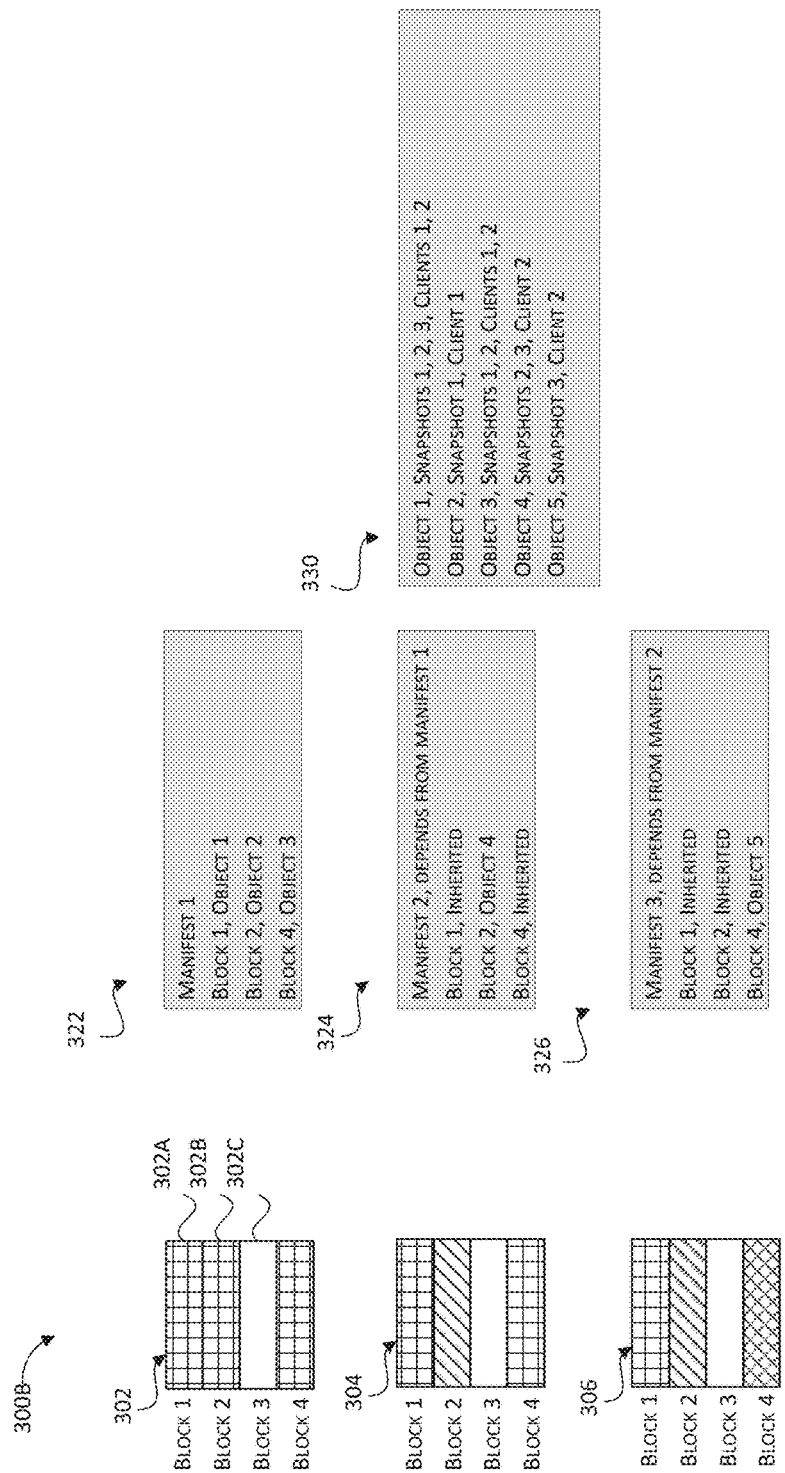
FIG. 3B depicts an example volume and three example snapshot manifests in accordance with aspects of the present disclosure.

FIG. 3A depicts the first volume 302, the second volume 304, and the third volume 306 as different point-in-time representations of a volume of a block storage device that is the basis for the first snapshot 312, the second snapshot 314, and the third snapshot 316. A person skilled in the art would understand that the first volume 302, the second volume 304, and the third volume 306 can have more or less than three snapshots that reference blocks of the volumes. As depicted in FIG. 3A, the volumes comprise blocks (e.g., logical groupings of data written as a group). As an example, each block of the block storage volume can be 4 kB. In the course of its operation, a user computing device may modify the volumes. In FIG. 3A, operating-system-level blocks such as block 302A and 302B that contain data (i.e. data has been written to the block) are represented by a filled rectangle as seen in FIG. 3A. Operating-system-level blocks that do not contain any data such as 302C are represented by an empty rectangle as seen in FIG. 3B.

Each of the first volume 302, the second volume 304, and the third volume 306 represents a different point-in-time representation of the volume and captures changes to one or more of the blocks of the volume. In the first volume 302, blocks 1, 2, and 4 contain data. In the second volume 304, blocks 1 and 4 contain the same data as in the first volume 302, as shown by the matching patterns of those blocks; however, block 2 contains updated data (e.g., data written to the volume subsequent to creation of snapshot 312 and prior to creation of snapshot 314). In the third volume 306, block 1 contains the same data as in the first volume 302, block 2 contains the same data as in the first volume 304, and block 4 contains different data.

Generally described, a snapshot can correspond to a point-in-time representation of a block storage volume, wherein the snapshot is stored on the one or more object storage servers as a set of objects. A snapshot is logically portioned into objects such that an object of a snapshot corresponds to one or more blocks of the volume. The first snapshot 312 may comprise snapshot objects 312A, 312B, and 312C and each snapshot object can refer to a block of the first volume 302. In the example of FIG. 3A, object 312A of the first snapshot 312 refers to Block 1 of the first volume 302, object 312B refers to Block 2 of the first volume 302, and object 312C refers to Block 4 of the first volume 302.

The second snapshot 314 may comprise snapshot blocks 314A, 314B, and 314C. In order to provide efficient storage of objects and reduced power consumption by the object storage server, each snapshot may include an object storing a point-in-time representation of a block, or may refer to an object of another snapshot including a point-in-time representation of the block. For example, the snapshot may refer to or depend on a parent snapshot, such that blocks not represented by objects of a child snapshot are instead represented by an object of an ancestor snapshot (or, if not represented by any ancestor, assumed to be unwritten). In the example of FIG. 3A, object 314A refers to Block 1 of the first volume 302. Due to the same version or point-in-time representation of block 1 of the volume being referenced by object 312A of the first snapshot 312 and object 314A of the second snapshot 314, object 314A may reference object 312A of the parent snapshot 312 instead of duplicating a state of Block 1 of the second volume 302. Object 314B refers to Block 2 of the second volume 302. However, object 314B refers to a different version or point-in-time representation of Block 2 of the volume than Object 312B and therefore, object 314B references Block 2 of the second volume 304 instead of Object 312B. In one implementations, clients may configure snapshots to reference blocks of volumes instead of objects of other snapshots by default. Object 314C refers to Block 4 of the second volume 304. Due to the same version or point-in-time representation of Block 4 of the volume, being referenced by object 312C of the first snapshot 312 and object 314C of the second snapshot 314, object 314C references object 312C of the first snapshot 312 instead of Block 4 of the second volume 304.

Further, in the example of FIG. 3A, object 316A of the third snapshot 316 references object 312A of the first snapshot 312, object 316B of the third snapshot 316 references object 314B of the second snapshot 314, and object 316D refers to Block 4 of the third volume 306.

As depicted in FIG. 3A, blocks 302A-C of a volume 302 can be represented in the subsequent snapshots by reference to the first snapshot or the corresponding snapshot object. The replication service 118, as referenced in FIG. 1, may be configured to determine that an object of the snapshot is referenced by a later-created snapshot, and thus to determine a number of snapshots that reference that object.

FIG. 3B depicts an example system 300B including the first volume 302, the second volume 304, and the third volume 306 as different point-in-time representations of a volume of a block storage device that is the basis for a first manifest 322, a second manifest 324, a third manifest 326, and an object record 330. FIG. 3B may correspond to FIG. 3A to further describe the replication service 118. The first manifest 322, the second manifest 324, and the third manifest 326 each correspond to a snapshot of blocks of the volume 302. As seen in FIG. 3A, the first manifest 322 may correspond to the first snapshot 312, the second manifest 324 may correspond to the second snapshot 314, and the third manifest 326 may correspond to the third snapshot 316. A person skilled in the art would understand that the first volume 302, the second volume 304, and the third volume 306 can have more or less than three manifests that correspond to or reference blocks of the volumes. The object records 330 represent a plurality of manifests associated with a plurality of snapshots of a volume. In the example of FIG. 3B, the object records 330 represents the first manifest 322, the second manifest 324, and the third manifest 326. In other configurations, the object record 330 may represent more or less manifests and corresponding snapshots associated with the volume. It should be understood that these depictions of the first volume 302, the second volume 304, the third volume 306, the first manifest 322, the second manifest 324, the third manifest 326, and the object record 330 are only one example implementing one or more aspects of the present disclosure. While each of the first volume 302, the second volume 304, and the third volume 306 is depicted to be comprised of four blocks, a person skilled in the art would understand that each volume can have more or less than four blocks. Further, each of the manifests referencing a block of the first volume 302, the second volume 304, or the third volume 306 can reference more or less than four blocks. In one implementation, each of the snapshots referencing a block of the first volume 302, the second volume 304, or the third volume 306 can reference one or more blocks of additional volumes in addition to referencing a block of the first volume 302, the second volume 304, or the third volume 306. Similarly, though FIG. 3B depicts the entries of the first manifest 322, the second manifest 324, the third manifest 326, and the object record 330 as comma separated values or expressions, a person of the ordinary skill in the arts would understand that the entries can be implemented in other ways such as the entries represented in binary, the entries as entries of a database structure, key-value data, look-up table, and the like.

FIG. 3B depicts volumes that comprise four blocks including blocks 302A, 302B, and 302C. Each block such as blocks 302A, 302B, and 302C can be logical segments of a volume, representing an illustrative block storage device. A block of a volume can be associated with a block index or identifier representing, for example, a logical block address of the volume. As depicted in FIG. 3B, the blocks of the first volume 302, the second volume 304, and the third volume 306 have indices 1-4. While a sequence of consecutive numeral indices is shown in FIG. 3B, other sequences are possible, such as non-consecutive integer sequences, sequences starting at an integer other than 1, or non-numeric sequences (e.g., alphabetical sequences). A volume and accordingly, any resulting snapshots corresponding to blocks of the volume, such as the first, second, and third snapshots of FIG. 3A can be sparse, meaning that some partitions, or blocks, of the volume do not have written data.

In FIG. 3B, blocks of the first volume 302 with written data such as blocks 302A and 302B are represented by filled boxes. Blocks without written data such as block 302C are represented by unfilled boxes.

Generally described, the first manifest 322, the second manifest 324, and the third manifest 326 enumerate the blocks of a corresponding volume and the particular objects of the snapshot that store data corresponding to those blocks. For example, the first manifest 322 corresponds to the first volume 302, the second manifest 324 corresponds to the second volume 304, and the third manifest 326 corresponds to the third volume 306. The first manifest 322, the second manifest 324, and the third manifest 326 may additionally contain metadata relating to the storage location of the objects that store data corresponding to blocks of the volume. The first manifest 322, the second manifest 324, and the third manifest 326 may enumerate the blocks in sequential order according to the block indices, for example, in ascending order. While each object of a snapshot is associated with a single block of the volume in FIG. 3B, in some cases, a single object of a snapshot may store information regarding multiple blocks of a volume. In FIG. 3B, each row of the first manifest 322, the second manifest 324, and the third manifest 326 represents an entry of the respective first manifest 322, second manifest 324, and third manifest 326. Each entry of the first manifest 322, the second manifest 324, and the third manifest 326 is enumerated by an entry number (each manifest corresponds to three entries). In one embodiment, one or more manifests may correspond to more or less entries, it being understood that a manifest can correspond to any number of entries. Each entry of the first manifest 322, the second manifest 324, and the third manifest 326 can indicate a block index, the object in which data of the block is stored, and the snapshot ID to which the object belongs. For example, in FIG. 3B, the first entry of the first manifest 322 indicates object 1 corresponds to Block 1 of the first volume 302. As another example, the third entry of the first manifest 322 indicates object 3 corresponds to Block 4 of the first volume 302.

The block index, objects, and snapshot ID may be indicated as integers, hexadecimals, string expressions, or the like. In some instances, an object identifier may include a prefix identifier indicating the top-level logical path of the object storage server in which the object is stored. The entry may contain additional information such as prefix, the address within the logical path of an object containing the block, file path data, checksum of the object data, block metadata for blocks referenced by the object, object metadata, or the like. An entry of the first manifest 322, the second manifest 324, and the third manifest 30 can be 8 kB, 16 kB, 32 kB, 100 kB, 1 MB, or the like. The first manifest 322, the second manifest 324, and the third manifest 326 may be stored on the object storage servers 110 upon creation of the snapshot and may be modified in response to snapshot operations.

Each entry of the first manifest 322, the second manifest 324, and the third manifest 326 can further indicate another manifest. For example, a manifest can indicate that an object of the manifest corresponds to an object within another manifest and the manifest may not reference the block of the volume. For example, in FIG. 3B, the first entry of the second manifest 324 indicates that it depends on the first manifest 322 and could point to the corresponding first entry in the first manifest 322. Further, the second entry of the third manifest 326 indicates that it depends on the second manifest 324 and could point to the corresponding second entry in the second manifest 324. Each object of each manifest may be referenced by any number of objects of other manifests.

The first volume 302, the second volume 304, and the third volume 306 may correspond to one or more object records for organizing the block data and snapshot data corresponding to the volume 302. Each of the one or more object records may correspond to a different object reference. For example, one object record may correspond to the number of snapshots referencing an object of the volume and another object record may correspond to the number of unique clients referencing an object of the volume. In one implementation, a volume may correspond to one object record corresponding to a plurality of object references. Each of the object records may include data indicating the object reference(s) corresponding to the respective object records.

The object records 330 further enumerate the snapshots that store data corresponding to blocks of the volume 302. The object records 330 may additionally contain metadata relating to the storage location of the objects that store data corresponding to snapshot blocks. The object records 330 may enumerate or parse the manifests of each snapshot in sequential order according to the block indices, for example, in ascending order for data corresponding to the objects of the snapshots. In one embodiment, the object records 330 may be grouped according to the snapshot of the object. In another embodiment, the object records 330 may be grouped according to the object index. In other embodiments, the object records 330 may be grouped according to any of the object references.

In FIG. 3B, each row of the object records 330 represents an entry of the respective object records. Each entry of the object records 330 is enumerated by a respective entry number (object records entries 1-5 of 330 in FIG. 3B). Each entry of the object records 330 can indicate a block index, the object in which data of the block is stored, and one or more block references. For example, in the object records 330, the snapshot ID, the object of the snapshot in which data of the block is being stored, the snapshots referencing the object, and the unique clients referencing the object. For example, if a client A references the object 1 of snapshot 1 with 5 different snapshots, the object records may illustrate this as only one unique client and as 5 snapshots.

While sequences of "Snapshot" plus "#" and "Clients" plus "#" are shown in FIG. 3B, other sequences are possible, such as pure integer sequences, alphanumerical sequences, non-numeric sequences (e.g., alphabetical sequences), etc. In one embodiment, the object records may be parsed to include only the total number of snapshots referencing the object or the total number of unique clients referencing the object. This information may be passed to a control plane (e.g., replication service 118 in FIG. 2-3) for further parsing and determining replication levels as seen in (4) of FIG. 2.

Figure 4:
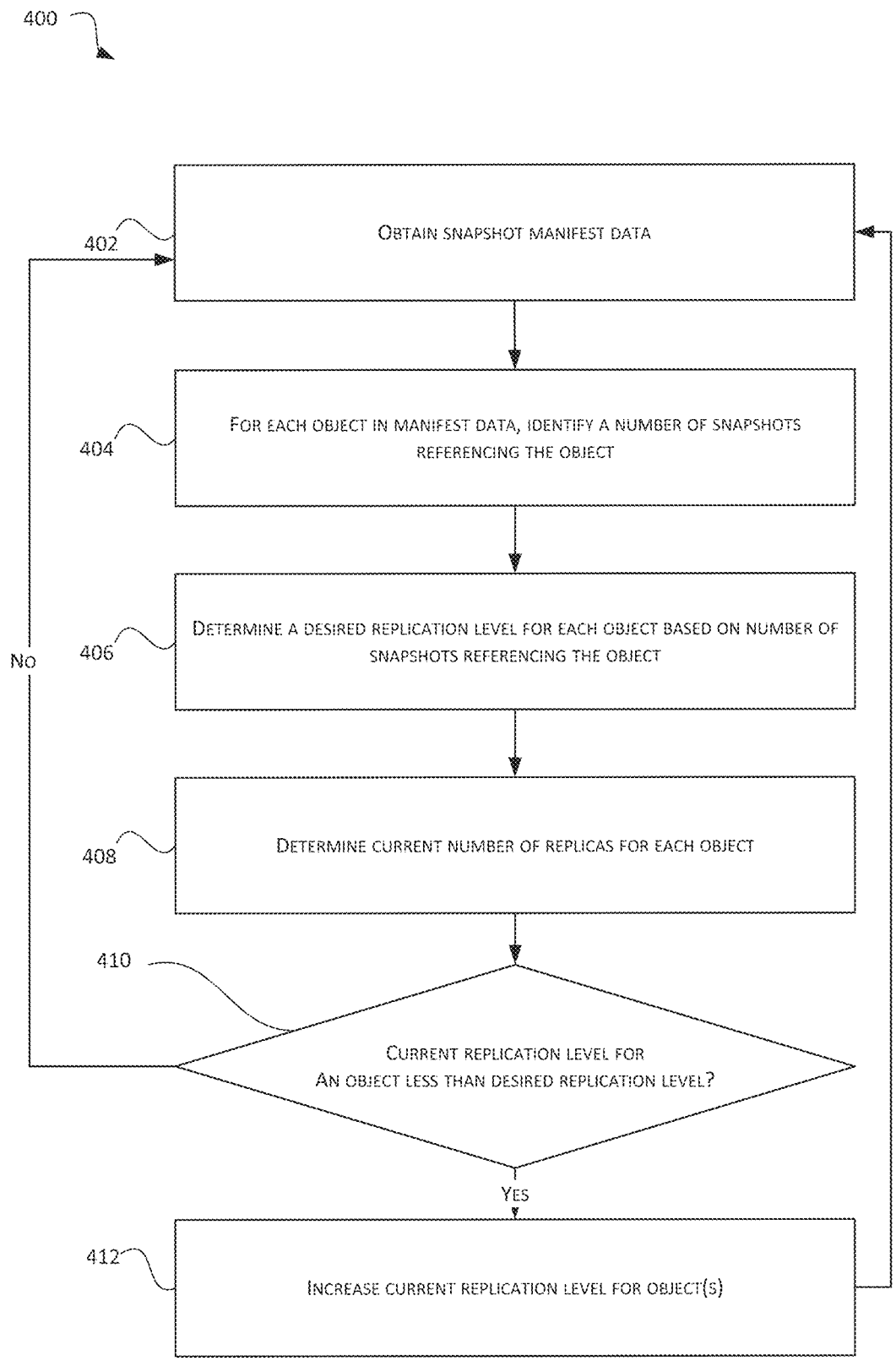
FIG. 4 shows a method executed by a cloud computing system for replication in accordance with aspects of the present disclosure.

FIG. 4 shows a method 400 executed by a replication service 118 as seen in FIG. 1, according to some examples of the disclosed technologies. The replication service 118 may be part of a cloud computing system 120 as seen in FIG. 1.

In a step 402, the replication service 118 may obtain snapshot manifest data regarding a plurality of snapshots in order to manage the objects contained within the snapshots. The information may correspond to manifests of snapshots of a logical volume, where the replication service 118 is configured to retrieve the manifests and/or the snapshots from the object storage 160. The replication service 118 may receive information corresponding to snapshots associated with one volume. In one embodiment, the replication service 118 may receive information corresponding to snapshots associated with multiple volumes. The information may be object records corresponding to a parsed version of one or more manifests, the object records referencing one or more objects of each snapshot corresponding to the system. The object records may be parsed to provide information about the objects of each snapshot. For example, the objects records can provide information about the number of clients referencing each object, the number of snapshots referencing each object, etc.

In a step 404, the replication service 118 may identify a number of snapshots referencing each of the objects of the manifest data. The replication service 118 may determine the number of times an individual object is referenced by snapshots based on the information provided in step 402. For example, the replication service 118 may identify a snapshot manifest that identifies an object, and determine a number of child snapshots that reference that object.

In one embodiment, the replication service 118 may include a distributed set of computing devices that provide for parallelization processing the manifest data. For example, the replication service 118 may be configured to utilize a partition key, such as snapshot identifiers associated with the snapshot manifest data, to divide manifests among the distributed set of computing devices. For example, the replication service 118 may assign a first portion of the snapshot IDs to a first computing device and a second portion of the snapshot IDs to a second computing device. While snapshot ID is used as an example of a partition key, any number of fields may be used as such a partition key. Preferably, a key is selected that is expected to provide an even distribution of manifests among the worker nodes. Each computing device may then process, at least partly concurrently, its assigned manifests, in order to determine a partial record for the objects of its assigned manifests. These partial records can then be combined to determine the number of times an individual object is referenced by snapshots represented in the manifest data. In one embodiment, processing of manifest data among the distributed set of computing devices follows the "map-reduce" algorithmic paradigm, which paradigm is generally known in the art. For example, individual computing devices may implement a "map" function that processes manifest data (e.g., divided according to a partition key) to determine a number of references of each object in that manifest data, and may further implement a "reduce" function that combines the data produced by the map function to determine, across the manifest data, a total set of references for each object.

In a step 406, the replication service 118 may determine a desired replication level for each object corresponding to a snapshot associated with the manifest data. The replication service 118 may determine a desired replication level for each object of the set of objects based on the number of times each object is referenced by a snapshot. The desired replication level may correspond to a number of replicas desired for a given object according to replication rules of the replication service 118. The replication rules may correspond to a level of replication for an object based on one or more data points of a manifest. For example, the replication rules of the replication service 118 may suggest five replicas for a first object that is referenced by fifty snapshots and one replica for a second object that is referenced by three snapshots. The replication rules may be provided by the replication service 118 or by a user. In one embodiment, the number of times the object is referenced by a snapshot may correspond to the number of times the object is referenced by a snapshot associated with a unique client.

In a step 408, the replication service 118 may determine a current replication level for each object. The replication service 118 may be configured to store information pertaining to the current replication level for each object or the replication service 118 may be configured to receive the current replication levels from the object storage service 110. The current replication level for each object may include a number of replicas of an object (e.g., including an "original" copy of the object), the location of each replica, the data of creation of each replica, and the time to live of each replica.

In a step 410, the replication service 118 may determine whether the current replication level for each object is less than the corresponding desired replication level by comparing the two levels. If the current replication level of each object meets or exceeds each corresponding desired replication level, the method 400 returns to block 402. The method may illustrative run as an "infinite loop," with block 402 being implemented at each period of a set of periods during execution of the replication service 118.

If a current replication level is less than a desired replication level, in a step 412, the replication service 118 increases the replication level for the object. Illustratively, the replication service 118 may request that the object storage service 110 increase a number of replicas of each object to match the desired replication level for each object. The object storage service 110 can then create the replicas and store the replicas on the service 110. In another embodiment, the replication service 118 may directly create and store replicas on the service 110. The replicas of each object may be stored on the same server of the object storage servers 110 or may be stored on different, isolated servers of the object storage servers 110. One or more replicas requested by the replication service 118 may be equipped with independent access control and the replication service 118 or the object storage service 110 may access or control the one or more replicas independently from the object. Thus, a level of replication commensurate with the "blast radius" of each object can be achieved.

In some embodiments, blocks 410 and 414 may be modified to also delete replicas to reach the desired replication level. In other embodiments, block 408 may be modified to reset a time-to-live value of any replicas up to the desired replication level, such that those replicas are prevented from being deleted by a garbage collection process. The replication service 118 may further determine an expiration schedule for each replica of an object already generated. The expiration schedule for each replica may be based on associated time-to-live value for the replica. After, determining an expiration schedule for each replica, the replication service 118 may be configured to determine an updated desired replication level as in step 406 according to the number of snapshots referencing the object and the replication rules. Based on the desired replication level, the current replication level, and the expiration schedule, the replication service 118 may modify the current replication level. For example, if the desired replication level is six replicas, the current replication level is eight replicas, and one replicas is set to expire within a certain time period, the replication service 118 may be configured to delete only one of the replicas due to the soon-to-expire replica. The method 400 then returns to block 402, as shown above.

As discussed above, the replicas created via the routine 400 may provide resiliency in the event of an object failure or adverse event. For example, in the event that a device (e.g., of the block store servers 105) is unable to read one or more objects of a snapshot's manifest, due to an adverse event such as data corruption or data loss, the device may read a replica of that object, thus preserving the ability to read the snapshot. In one embodiment, the device may communicate with the replication service 118 to obtain identifying information regarding replicas of an object. Illustratively, the replication service 118 may contain information about each replica of each object of an associated manifest. For example, the replication service 118 may contain information about the ID, location, creation date, expiration schedule, or time-to-live of each object. Based on the information of the replication service 118, the replication service 118 may redirect a device to a replica of an object that it is unable to read. In some instances, the replication service 118 or the device may further edit the manifest of the corresponding snapshot such that the manifest may include a designation of a replica of the object, as opposed to the corrupted object. In other instances, the object identified in a manifest of the snapshot may be recreated using the replica, such that the recreated object again contains non-corrupted data. In this manner, data loss to due corruption of an object can be avoided.

Figure 5:
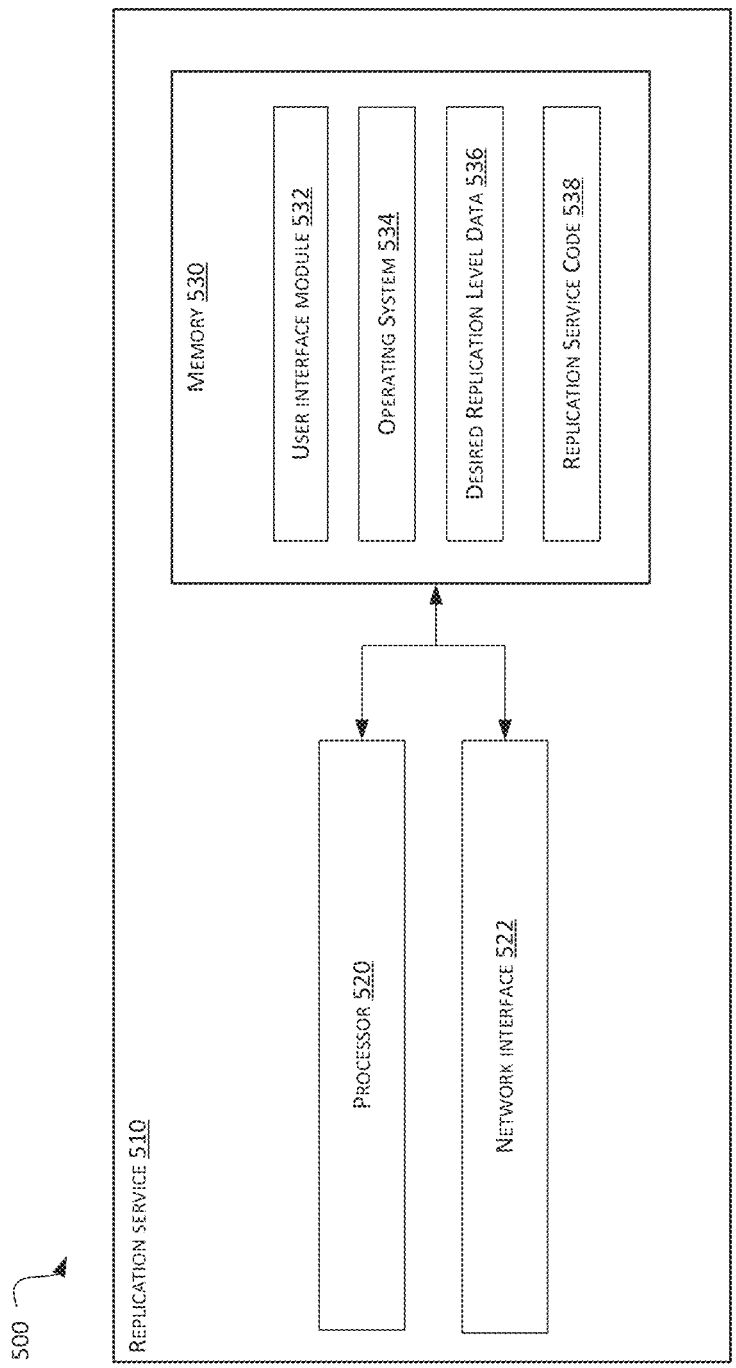
FIG. 5 depicts a general architecture of a computing device or system providing a replication service in accordance with aspects of the present disclosure.

FIG. 5 depicts an example architecture of a computing system (referred to as the replication service 510) that can be used to perform one or more of the techniques described herein or illustrated in FIGS. 1-4. The general architecture of the replication service 510 depicted in FIG. 5 includes an arrangement of computer hardware and software modules that may be used to implement one or more aspects of the present disclosure. The replication service 510 may include many more (or fewer) elements than those shown in FIG. 5. It is not necessary, however, that all of these elements be shown in order to provide an enabling disclosure. As illustrated, the replication service 510 includes a processor 520 and a network interface 522 which may communicate with one another by way of a communication bus. The network interface 522 may provide connectivity to one or more networks or computing systems. The processor 520 may thus receive information and instructions from other computing systems or services via the network 104 illustrated in FIG. 1.

The processor 520 may also communicate with memory 530. The memory 530 may contain computer program instructions (grouped as modules in some embodiments) that the processor 520 executes in order to implement one or more aspects of the present disclosure. The memory 530 may include RAM, ROM, and/or other persistent, auxiliary, or non-transitory computer-readable media. The memory 530 may store an operating system 534 that provides computer program instructions for use by the processor 520 in the general administration and operation of the replication service 510. The memory 530 may further include computer program instructions and other information for implementing one or more aspects of the present disclosure. For example, in one embodiment, the memory 530 includes a user interface module 532 that generates user interfaces (and/or instructions therefor) for display upon a user computing device, e.g., via a navigation and/or browsing interface such as a browser or application installed on the user computing device. In addition, the memory 530 may include or communicate with one or more data stores.

In addition to and/or in combination with the user interface module 532, the memory 530 may include the block manager 536 that may be executed by the processor 520. In one embodiment, the block manager 536 implements various aspects of the present disclosure, e.g., creating a block replica, destroying a block replica, and/or other aspects discussed herein or illustrated in FIGS. 1-4.

While the block manager 536 is shown in FIG. 5 as part of the replication service 510, in other embodiments, all or a portion of the block manager 536 may be implemented by other components of the cloud computing system 120 and/or another computing device. For example, in certain embodiments of the present disclosure, another computing device in communication with the cloud computing system 120 may include several modules or components that operate similarly to the modules and components illustrated as part of the replication service 510. It will also be appreciated that, in some embodiments, a user computing device may implement functionality that is otherwise described herein as being implemented by the elements and/or modules of the replication service 510. For example, the user computing device 102 may receive code modules or other instructions from the replication service 510 and/or other components of the cloud computing system 120 via the network 104 that are executed by the user computing device 102 to implement various aspects of the present disclosure.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   at least one server configured to store at least a block storage volume, the block storage volume comprising a plurality of blocks;
   one or more object storage servers storing:
      a set of objects, each object representing a point-in-time representation of at least one block of the block storage volume; and
      a set of manifests arranging the set of objects into a plurality of snapshots of the block storage volume, each snapshot corresponding to a point-in-time representation of the plurality of blocks of the block storage volume, each manifest identifying individual objects, of the set of objects, that represent a point-in-time representation of individual blocks, of the plurality of blocks, at a time corresponding to the snapshot;
      wherein at least one snapshot of the plurality of snapshots represents an incremental snapshot relative to a parent snapshot of the plurality of snapshots, and wherein at least one object of the incremental snapshot is inherited from the parent snapshot; and
   a computing system in communication with the one or more object storage servers and the at least one server, the computing system configured to:
      generate relative replication rules for the set of objects based at least partly on a relative number of references to each object of the set of objects within the set of manifests, wherein the relative number of references to each object is indicative of a number of references to each object relative to a number of references to other objects within the set of objects, the relative replication rules indicating object replication thresholds for objects of the set of objects based at least partly on the relative number of references to each object within snapshots of the plurality of snapshots, wherein the object replication thresholds identify one or more replication levels, each of the one or more replication levels identifying a particular relative number of references by the snapshots to a particular object and a corresponding desired replication level for the particular object, and for each object of the set of objects:
  determine, from at least the set of manifests, a number of snapshots of the plurality of snapshots that reference the object,
  determine, from at least the number of snapshots that reference the object and the relative replication rules, a desired replication level for the object,
  determine a current number of replicas of the object stored on the object storage servers,
  determine that the current number of replicas does not meet the desired replication level for the object, and
  increase a number of replicas of the object stored on the object storage servers to match the desired replication level for the object.

2. The system of claim 1, wherein the number of snapshots that reference the object corresponds to a number of snapshots associated with different clients that reference the object.

3. The system of claim 1, wherein to increase the number of replicas stored on the object storage servers to match the desired replication level for the object, the computing system is further configured to generate a subset of replicas and storing each replica of the subset of replicas on an isolated object storage server, wherein the isolated object storage server is separate from the one or more object storage servers storing the object.

4. The system of claim 1, wherein the computing system is further configured to:
  for each object of the set of objects:
    generate an expiration schedule for one or more of the number of replicas;
    determine, from at least the set of manifests, an updated number of snapshots of the plurality of snapshots that reference the object;
    determine, from at least the updated number of snapshots that reference the object and the relative replication rules, an updated desired replication level for the object;
    determine that the number of replicas does not meet the updated desired replication level for the object; and
    preserve a subset of the number of replicas, based at least in part on the expiration schedule and the updated desired replication level.

5. A system comprising:
  at least one server configured to store one or more block storage volumes, the one or more block storage volumes comprising a plurality of blocks;
  an object storage server configured to store:
    a set of objects, each object corresponding to a block of the plurality of blocks, and
    a set of manifests arranging the set of objects into a plurality of snapshots of the block storage volume, each manifest identifying individual objects, of the set of objects, that correspond to a respective snapshot; and
  a computing system in communication with the object storage server and the at least one server, the computing system configured to:
    generate relative replication rules for the set of objects based at least partly on a relative number of references to individual objects of the set of objects within the set of manifests, wherein the relative number of references to an individual object is indicative of a number of references to the individual object relative to a number of references to one or more other objects within the set of objects, the relative replication rules indicating object replication thresholds for objects of the set of objects, wherein the object replication thresholds identify one or more replication levels, each of the one or more replication levels identifying a particular relative number of references by the snapshots to a particular object and a corresponding desired replication level for the particular object; and
    for individual objects of the set of objects:
      determine, from at least the set of manifests, a number of snapshots that reference the individual object,
      determine, from at least the number of snapshots that reference the individual object and the relative replication rules, a desired replication level for the individual object, and
      modify a current replication level of the individual object, based at least in part on the desired replication level for the individual object, wherein the current replication level comprises a current number of replicas and the desired replication level comprises a desired number of replicas.

6. The system of claim 5, wherein modifying the current replication level of the individual object comprises decreasing a number of replicas of the object.

7. The system of claim 5, wherein the number of snapshots that reference the individual object corresponds to a number of snapshots associated with different clients that reference the individual object.

8. The system of claim 5, wherein to modify the current replication level, the computing system is further configured to generate a number of replicas and store each replica on an isolated object storage server, wherein the isolated object storage server is separate from the object storage server storing the individual object.

9. The system of claim 5, wherein the computing system is further configured to store a subset of replicas of the individual object in a plurality of object storage servers.

10. The system of claim 5, wherein one or more replicas of the desired number of replicas of the individual object are configured with independent access control.

11. The system of claim 5, wherein the computing system is further configured to:
  for individual objects of the set of objects:
    generate an expiration schedule for one or more of the current number of replicas;
    determine, from at least the set of manifests, an updated number of snapshots that reference the individual object;
    determine, from the updated number of snapshots that reference the individual object and the relative replication rules, an updated desired replication level for the individual object; and
    modify the current replication level of the individual object, based at least in part on the updated desired replication level, the current replication level, and the expiration schedule.

12. The system of claim 5, wherein to modify the current replication level of the individual object, the computing system is further configured to manage at least a first replica and a second replica of the individual object, the first replica associated with a first subset of snapshots that reference the individual object and the second replica associated with a second subset of the snapshots that reference the individual object.

13. The system of claim 5, wherein the object storage server is configured to associate one or more snapshots of snapshots that reference the individual object with a replica of the individual object based at least in part on an unavailability of the individual object.

14. A computer-implemented method comprising:
maintaining, at an object storage server of a cloud provider network, a plurality of snapshots, each snapshot of the plurality of snapshots representing a point-in-time representation of blocks within a block storage volume, wherein each snapshot is maintained as a set of objects of the object storage server;
obtaining a plurality of manifests corresponding to the plurality of snapshots;
identifying, for each object of the plurality of snapshots, a number of snapshots that reference the object;
generating relative replication rules for the set of objects based at least partly on a relative number of references to individual objects of the set of objects within the plurality of manifests, wherein the relative number of references to an individual object is indicative of a number of references to the individual object relative to a number of references to one or more other objects within the set of objects, the relative replication rules indicating object replication thresholds for the objects of the set of objects, wherein the object replication thresholds identify one or more replication levels, each of the one or more replication levels identifying a particular number of references by snapshots to a particular object and a corresponding desired replication level for the particular object,
determining a desired replication level for each object based at least in part on the number of snapshots that reference the object and the relative replication rules;
determining a current replication level for each object; and
modifying a number of replicas of each object based on the desired replication level and current replication level for each object.

15. The method of claim 14, wherein modifying the number of replicas of each object comprises decreasing the number of replicas of one or more objects.

16. The method of claim 14, wherein the desired replication level is based at least in part on a number of customers associated with the object.

17. The method of claim 14, wherein the desired replication level is based at least in part on a number of snapshots associated with the object.

18. The method of claim 14, the method further comprising:
generating an expiration schedule for one or more of the number of replicas for each object;
determining, from at least the plurality of manifests, an updated desired replication level for each object; and
modifying the number of replicas of each object, based at least in part on the updated desired replication level for each object, the current replication level for each object, and the expiration schedule for the one or more of the number of replicas for each object.

19. The method of claim 14, wherein modifying the number of replicas of each object comprises managing at least a first replica and a second replica of the object, the first replica associated with a first subset of snapshots that reference the object and the second replica associated with a second subset of the snapshots that reference the object.

20. The method of claim 14, wherein the object storage server is configured to associate one or more snapshots that reference an object with a replica of the number of replicas of the object.

* * * * *